United States Patent

[11] 3,590,676

| [72] | Inventor | Manfred Fritz<br>Dusseldorf-Erkrath, Germany |
|---|---|---|
| [21] | Appl. No. | 764,759 |
| [22] | Filed | Oct. 3, 1968 |
| [45] | Patented | July 6, 1971 |
| [73] | Assignee | Schloemann Aktiengesellschaft<br>Dusseldorf, Germany |
| [32] | Priority | Oct. 6, 1967 |
| [33] | | Germany |
| [31] | | P 16 27 288.1 |

[54] GRIPPER SHEARS
10 Claims, 5 Drawing Figs.

[52] U.S. Cl. ................................................. 83/311, 83/328
[51] Int. Cl. ............................................. B23d 25/02
[50] Field of Search .......................................... 83/299, 315, 316, 311, 328

[56] References Cited
UNITED STATES PATENTS
2,258,339  10/1941  Sieger........................... 83/315 X
2,843,202  7/1958  Hallden........................ 83/315 X

*Primary Examiner*—James M. Meister
*Attorney*—Holman & Stern

ABSTRACT: In a flying shear for transversely cutting moving rolled stock, it is desirable to provide means for altering the length of rolled stock which is to be cut. The flying shear has means for matching the tangential velocity of the knives to the velocity of the stock and has means for altering the interval between cuts of the knives. The flying shear includes a first knife carrier pivotably mounted on a rotatable drive crank, a second knife carrier pivotably mounted on the shear base, the knife carriers having arms which are pivotably connected, and means for adjusting the throw of the crank and compensating adjustment means for adjusting the distance between the axis of the crank and the stock to be cut, so that adjustment of the adjusting means and the drive speed of the crank with respect to the rate at which stock is supplied permits the length of stock cut to be adjusted.

INVENTOR
MANFRED FRITZ
BY

ATTORNEY

GRIPPER SHEARS

The shears comprising two knife carriers each adapted to have a knife mounted thereon, and the knife carriers each having arms which are pivotably connected together. The shear has means for controlling the movement of the knife carriers so that in cutting stock the knives are moved together to cut the stock at the instant where their tangential velocity is the same as the velocity of the stock. In the case of such a shear in which the crank rotates at a constant speed, the length of stock cut corresponds to the length of path travelled by the knives, i.e. the length of stock cut corresponds to the radius or throw of the crank, if the stock is fed to a rate equal to the tangential velocity of the knives at the instant of cutting. In order to adapt a flying shear to cut a desired length of the rolled stock in the past the practice has been to drive the crank through nonuniform gears such as elliptical gears so that the tangential velocity of the knives in the cutting zone matches the velocity of the moving stock however the knives are accelerated as they approach the cutting zone and are also decelerated after passing through the cutting zone. In such nonuniform gears substantial working this acceleration and braking produces a load on the apparatus and expensive, heavy and complex machinery must be used. The moments of inertia in addition to the load resulting from shearing the stock are caused by the accelerating and braking, and these moments of inertia increase with the angular speed of the rotating knives.

According to the present invention, there is provided a flying shear for transversely cutting moving rolled stock, the flying shear comprising a body portion, two knife carriers each adapted to carry a knife, a lever arm extending from each knife carrier, a crank mounted on the body portion and adapted to be driven to rotate about an axis extending substantially perpendicular to the direction in which the stock is arranged to be moved and in a plane substantially parallel to the stock, a first of said knife carriers being rotatably mounted on said crank, the second of said knife carriers being pivotally mounted on said body portion about an axis extending substantially parallel to said crank axis, and said lever arms extending from each knife carrier being pivotably connected about an axis of pivoting extending substantially parallel to said crank axis, first means for adjusting the throw of the crank, and second means for adjusting the distance between the axis of the crank and the axis of pivoting of the crank whereby, the speed of the crank, the first adjusting means and the second adjusting means are suitably adjusted relative to the rate at which the stock is supplied for cutting to move the knife such that when knives are mounted on the knife carrier the knives are moved to cooperate to cut the stock and the tangential velocity of the knives is substantially the same as the velocity of the stock at the time of cutting.

A flying shear according to the present invention can be suitable for use with stock being supplied at any rolling spaced and furthermore a flying shear according to the present invention can obviate the disadvantage of additional loads imposed, for example, by nonuniform gears.

In using a flying shear according to the present invention after each adjustment of the throw of the crank, or simultaneously with this adjustment, the second adjusting means are operated to compensate for the first adjustment by repositioning the axis of the crank so that the first knife carrier again cooperates correctly with the lower knife carrier. If the throw of the crank is reduced then the distance between the axis of the crank and the axis of pivoting of the second knife carrier must be reduced by a corresponding amount. On reducing the throw of the crank the tangential velocity of a knife mounted on the first knife carrier will be correspondingly reduced. If the speed of the crank is maintained at a constant rate then the velocity of the moving stock must be reduced by an amount corresponding to the reduction in throw of the crank, so that the velocity of the stock matches the tangential velocity of the knives and since the period of rotation of the knives is constant the interval between cuts in the stock is reduced. Alternatively, the stock can be supplied at a constant rate and the speed of the crank increased upon reduction of the throw of the crank so that the knives again have a tangential velocity equal to the velocity of the stock but since the crank rotates more quickly the period between cuts will be shortened and accordingly the stock will be cut in shorter lengths.

No load in addition to that resulting from a cutting operation is imposed on the apparatus since nonuniform movement of the knives is obviated; accordingly the weight size and expense of the flying shear can be reduced.

The first adjusting means may comprise a first portion associated with the pin of the crank and a second portion associated with the shaft of the crank, one of said portions having a threaded spindle rotatably mounted but axially fixed thereon, the axis of the spindle extending in the direction of the arm of the crank and the other of said portions having a captive nut mounted thereon and mounted on the threaded spindle and means for rotating the nut, whereby the first portion is movable in the radial direction of the crank on rotation of the nut to adjust the throw of the crank.

The second adjustment means may comprise a first portion associated with the portion of said body portion on which the crank is mounted, and a second portion associated with the portion of the body portion on which the second knife carrier is pivotally mounted, one of said portions having a threaded spindle rotatably mounted but axially fixed thereon, the axis of the spindle extending in the direction of the direction between the axis of the crank and the axis of pivoting, and the other of said portions having a captive nut mounted thereon and mounted on the threaded spindle and means for rotating the nut.

Preferably, the first and second adjustment means are both as described in the two preceding paragraphs, and the flying shear includes adjustment drive means, and gear means for connecting the adjustment drive means to the respective nuts, whereby the same adjustment is made at each of the adjusting means. In this way precisely the same adjustment can be made by both adjusting means.

In one embodiment the flying shear may have the shaft portion of the crank mounted on the body portion, the shaft portion being in the form of a hollow shaft, and the gear means associated with the first adjustment means may include a drive shaft mounted within said hollow shaft and connected to gearing so as to be normally rotated with the hollow shaft, the gearing including control gearing arranged to alter the speed of rotation of the drive shaft with respect to the other shaft so as to operate the first adjusting means to alter the length of the throw of the crank, and to replace the drive shaft in its normal position when the desired adjustment has been carried out.

The control gearings may be provided by a planatory gear system comprising the elements of a sun pinion, at least one planatory pinion, and an annulus a drive from the adjustment drive means being arranged to be applied to a first of said elements, a second of said elements being connected to the hollow shaft and the third of said elements being connected to said drive shaft, whereby said first element is normally fixed so that drive is transmitted between the second and third of said elements.

The second knife carrier is preferably mounted on the body portion through a mounting crank which is arranged to be driven in synchronism with said crank so that the second knife carrier only passes through its cutting position once for every rotation of the mounting crank.

The mounting crank is preferably connected to a variable gear having gear selection means, the variable gear being adapted to connect the mounting crank to the drive at the desired ratio. In this way the second knife carrier can be brought into the cutting position at variable intervals so that the length of stock cut can be altered.

The invention will be further described by way of example with reference to the accompanying drawings, of which:

Figure 1:
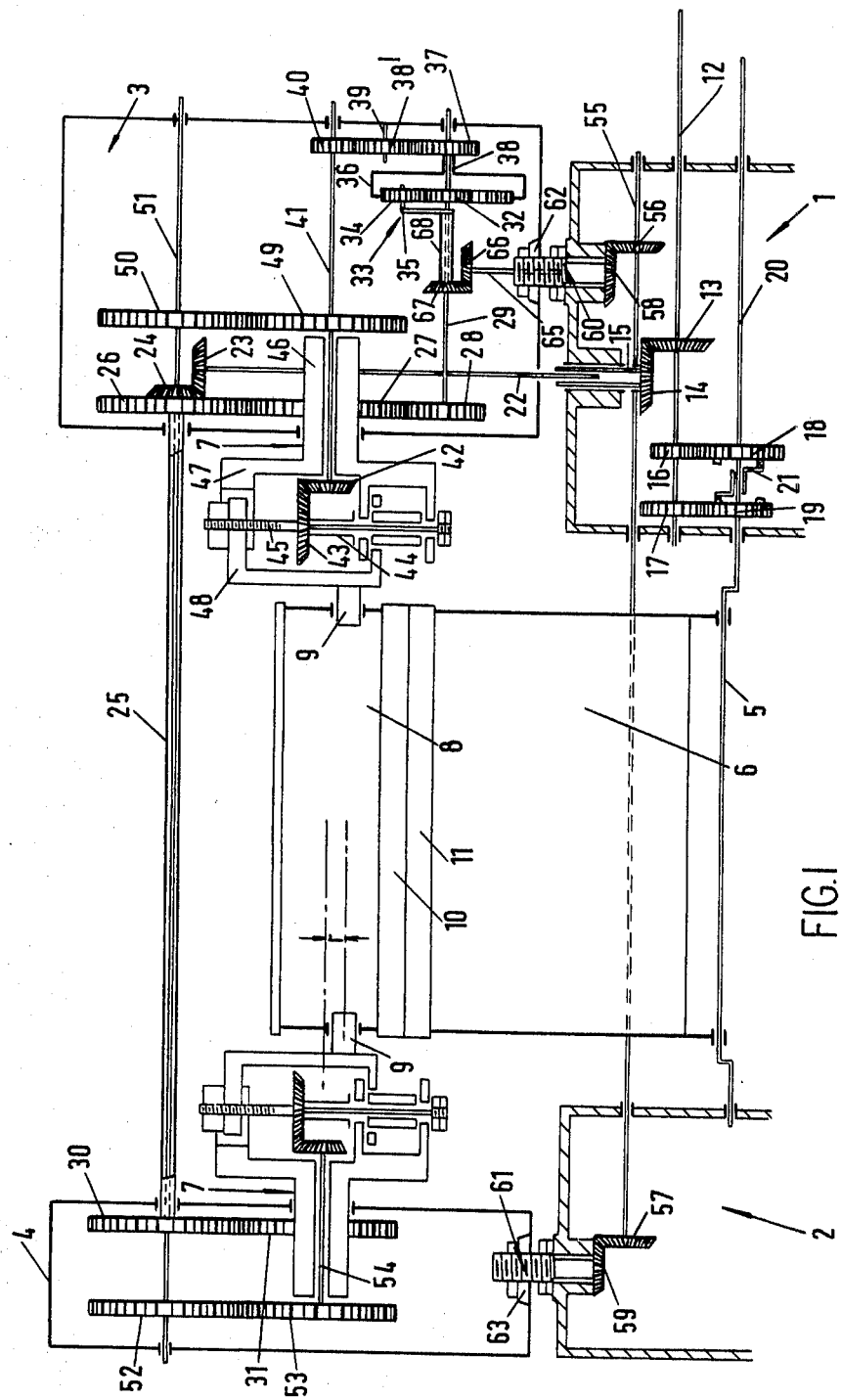
FIG. 1 is a schematic front elevational view of a flying shear according to the invention.

As indicated in FIG. 1, the flying shear according to the invention includes two base members 1 and 2 disposed generally at the sides of the flying shear, respective side supports 3 and 4 mounted on the base members 1 and 2 so as to be vertically displaceable, a lower crankshaft 5 on which a lower knife carrier 6 is pivotably mounted, a main crankshaft 7 mounted between the side supports 3 and 4, and an upper knife carrier 8 pivotably mounted on the crank pins 9 of the main crankshaft 7. The upper and lower knife carriers 8 and 6 carry respective knives 10 and 11 the knife carriers 8 and 6 each have lever arms extending therefrom (not shown in FIG. 1), the lever arms being pivotably connected together. The lever arms must permit the rolled stock to pass between the knives and conveniently the lever arms are formed by an arm at each side of each knife carrier 8 and 6.

The flying shear, as shown in FIG. 1 has a main drive shaft 12 rotatably mounted on bearings in the base member 1. In the middle portion of the base member 1 the main drive shaft 12 has fixedly mounted thereon a first bevel pinion 13 in constant mesh with a second bevel pinion 14 which is mounted on a stub shaft 15. The stub shaft 15 is rotatably mounted in the top wall of the base member 1. Pinions 16 and 17 are also fixedly mounted on the main drive shaft 12, these pinions being in constant mesh with pinions 18 and 19 respectively which are rotatably mounted on the shaft portion 20 of the lower crankshaft 5. A selector ring 21 is mounted on the shaft portion 20 so as to be axially displaceable but rotatably fixed thereto between the pinions 18 and 19. The selector ring 21 is movable by selection means to engage either of the pinions 18 and 19 so that one of them is coupled to transmit drive to the shaft portion 20.

Transmission through the pinions 17 and 19 drives the lower crankshaft 5 at a ratio of 1:1 with the main drive shaft 12 whereas connection to the pinions 16 and 18 drives the lower crankshaft at a ratio of 1:2. By these means a rotary motion is imparted to the lower knife 6.

The stub shaft 15 is free to rotate but is axially fixed. The upper end portion of the stub shaft is hollow and is internally splined to engage with corresponding splines on the free end portion of a shaft 22. At its opposite end the shaft 22 carries a third bevel pinion 23 which is in constant mesh with a fourth bevel pinion 24 mounted on the end of a hollow cross shaft 25 which is rotatably mounted in and extends between the side supports 3 and 4. Adjacent the fourth bevel pinion 24, the hollow cross shaft 25 carries a fixed pinion 26 which is in constant mesh with a pinion 27 which is pivotably mounted on the main crankshaft 7, the pinion 27 being in constant mesh with a further pinion 28 which is fixedly mounted on the end of a subsidiary shaft 29. Rotation of the main drive shaft is thus transmitted to the main crankshaft 7 and also the subsidiary shaft 29.

At its end portion within the side support 4, the hollow cross shaft 25 carries a fixed pinion 30 which is identical with pinion 26, the pinion 30 being in constant mesh with a pinion 31 fixedly mounted on the main crankshaft, this pinion 31 being identical with pinion 27. Thus the same driving force is transmitted to both ends of the main crankshaft 7.

The main crankshaft 7 and the lower crankshaft 5 are initially positioned so that the knives 10 and 11 come together to shear the stock as required.

The subsidiary shaft 29 is rotatably mounted in bearings in the side support 3, carries a further pinion which is the sun gear 32 of a planatory gear system 33. The planatory gear system shown in FIG. 1 has only one planatory pinion 34 which is mounted on a planet carrier 35, and an annulus 36. In normal operation the planet carrier is fixed against rotation, as will be described in more detail below, and accordingly rotation of the sun gear 32 is transmitted, in the opposite rotary direction, to the annulus 36. A pinion 37 is connected to the annulus 36 via a sleeve 38, the pinion 37 being in constant mesh with a pinion 38 which is rotatably mounted on a stub shaft 39, the pinion 38 being itself in constant mesh with a pinion 40 which is fixedly mounted on a secondary subsidiary shaft 41. The second subsidiary shaft 41 is rotatably mounted in the side support 3. The second subsidiary shaft 41 passes through the hollow shaft portion of the main crankshaft 7 and is rotatable therein. At the end of the second subsidiary shaft 41 a fifth bevel pinion 42 is mounted in constant mesh with a sixth bevel pinion 43 which is fixed to an internally threaded sleeve or nut 44 arranged on a threaded spindle 45.

The main crankshaft 7 is formed in two separate portions one portion being associated with each side support 3 and 4 as each portion of the main crankshaft is in all respects the same, only the portion associated with the side support 3 will be described. As will be described in more detail with reference to FIG. 4, the main crankshaft 7 consists of a hollow shaft portion 46 which is rotatably mounted in the side support 3 a crank web consisting of a back portion 47 fixed to the hollow shaft portion 46 and a displaceable portion 48 displaceably mounted on the back portion 47 through the threaded spindle 45 and the sleeve or nut 44, and the crank pin 9 mounted on the displaceable portion 48.

As will be described in more detail below, the throw of the crank i.e. the distance $r$ between the axis of rotation of the crank and the axis of the crank pins 9 can be adjusted by altering the speed of the second subsidiary shaft 41 to rotate the sleeve or nut 44 and thereby displace the threaded spindle 45. It will be noted that the second subsidiary shaft 41 is normally driven at the same speed as the main crankshaft 7 and that altering the speed of the second subsidiary shaft 41 will alter the throw of the crank.

The second subsidiary shaft 41 has fixed thereto a pinion 49 in constant mesh with a pinion 50 which is fixedly mounted on a subsidiary cross shaft 51. The subsidiary cross shaft 51 is rotatably mounted between the side supports 3 and 4 and extends through the hollow cross shaft 25. In its portion within the side support 4 the subsidiary cross shaft 51 carries a fixed pinion 52 which is in constant mesh with a pinion 53 which is fixed to a third subsidiary shaft 54 which is arranged in association with the main crankshaft 7 in the same way as the second subsidiary shaft 41.

The adjusting means of the flying shear shown in FIG. 1 are all controlled by rotating a single shaft, adjusting shaft 55. The adjusting shaft 55 is rotatably mounted in and extends between the base members 1 and 2 in which adjustment bevel pinions 56 and 57 are respectively mounted on the adjustment shaft 55. The bevel pinions 56 and 57 are in constant mesh with respective bevel pinions 58 and 59 which are mounted on the lower ends of threaded spindles 60 and 61 respectively the threaded spindle 60 and 61 are each rotatably mounted in the top of the respective side supports 3 and 4, but axially fixed therein. The upper ends of each threaded spindle engage with internally threaded bosses 62, 63 secured in the bottom of the respective side supports 3 and 4, so that rotation of the adjustment shaft 55 is transmitted to the threaded spindle 60 and 61 which rotate in exactly the same manner to raise or lower both side supports 3 and 4 by the same amount. The threaded spindle 60 has an internally grooved bore into which a spline shaft 65 fits.

The spline shaft 65 is rotatably mounted in the side support 3 and is arranged to be rotated with the threaded spindle 60. At the upper end of the spline shaft 64 a double pinion 66 is fixed in constant mash with a double pinion 67 fixed to a sleeve 68. The sleeve 68 is rotatably mounted on the subsidiary shaft 29 and is connected to the planet carrier 35.

It will be seen that rotation of the adjustment shaft 55 is transmitted via the spline shaft 65 to the planet carrier 35, rotation of the planet carrier affecting the rotation of the annulus so that the annulus either rotates more quickly or more slowly than the sun gear.

As a result rotation of the adjustment shaft 55, the rate of revolution of the annulus 36 is altered and thereby the feed of the second subsidiary shaft 41 and a third subsidiary shaft 44 is also altered. In this way the throw of the main crankshaft 7 is altered by the same amount as the spacing between the side supports 3 and 4 and the base numbers 1 and 2, since the gearing is in a 1 to 1 ratio.

FIGS. 2 to 5 show a working embodiment of the flying shear illustrated schematically in FIG. 1. Like parts will be given like reference numerals and it is to be understood that the above description applies to the flying shear shown in FIGS. 2 to 5.

Figure 2:
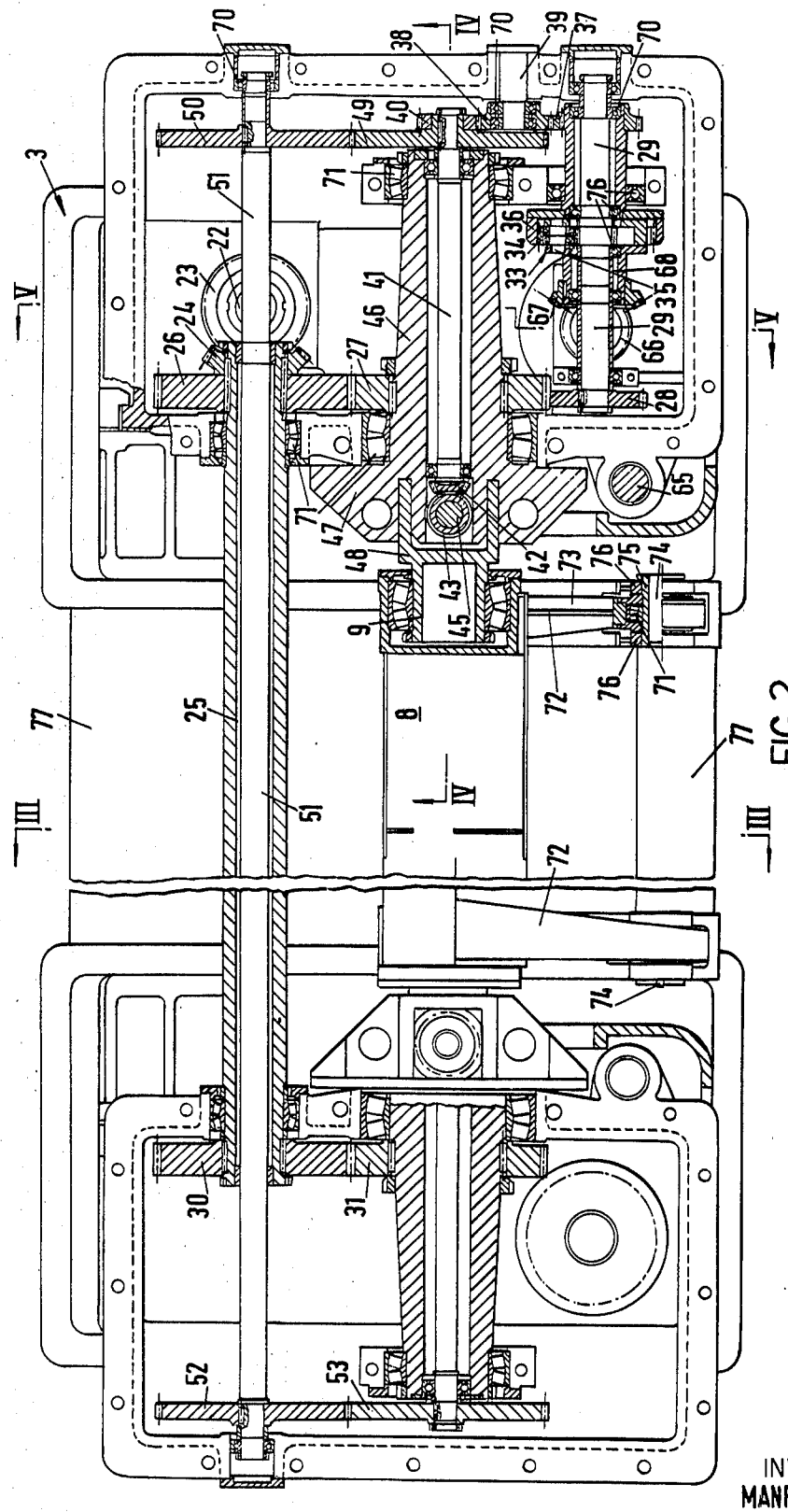
FIG. 2 is a part cross-sectional plan view of the flying shear shown schematically in FIG. 1.

In the plan cross-sectional view of the flying shear shown in FIG. 2, in the side support 3, the subsidiary cross shaft 51, the hollow cross shaft 25, the hollow shaft portion 46, the second subsidiary shaft 41, and the subsidiary shaft 29 are all arranged parallel to one another in the same horizontal plane. The shafts contained in the side support 4, together with their associated elements, all correspond to the elements shown and described with reference to side support 3 and will therefore not be described further. The various shafts are mounted in the side support 3 by suitable bearings, the ball bearings being given the reference numeral 70 and the roller bearings the reference numeral 71.

Figure 3:
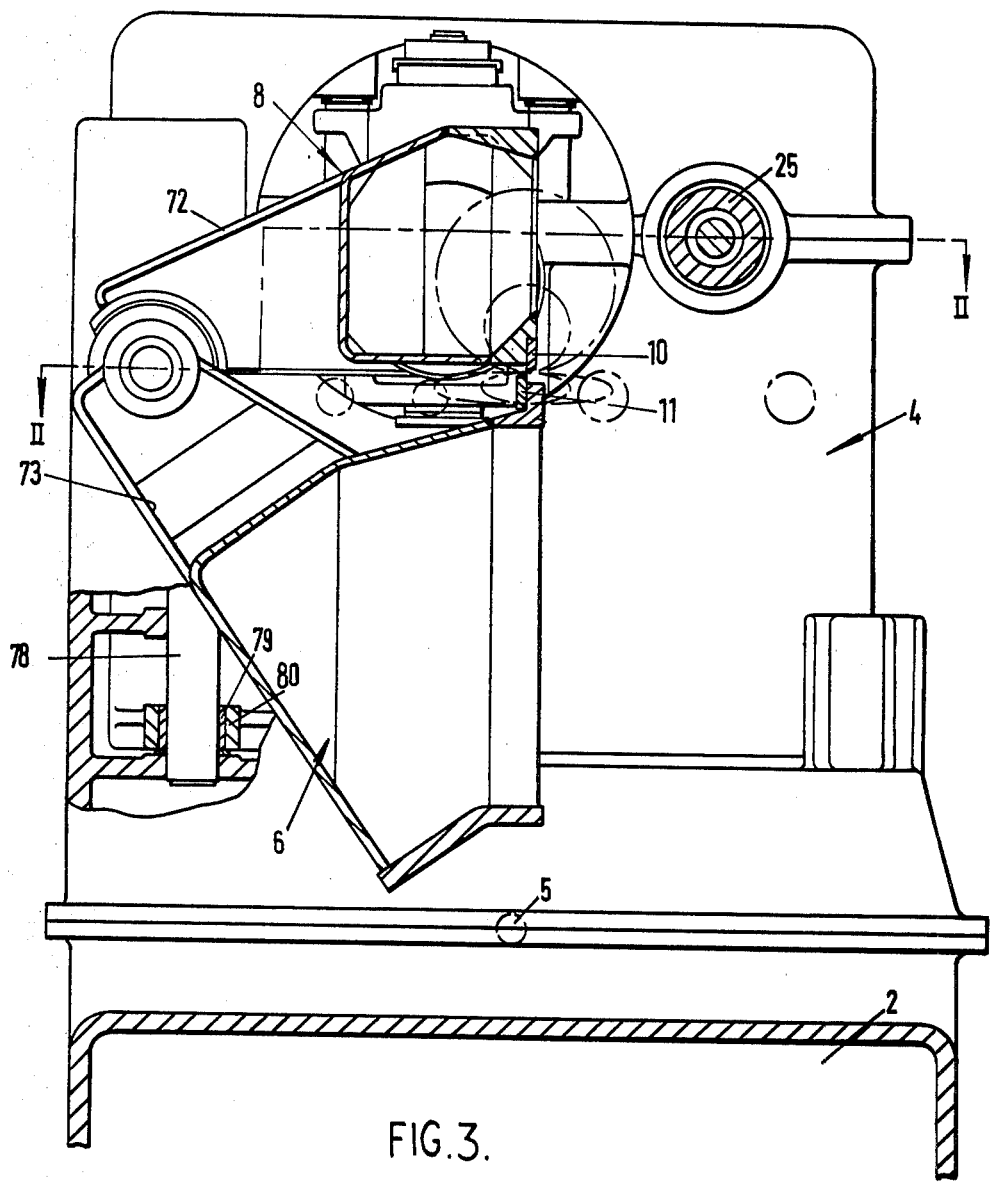
FIG. 3 is a cross-sectional view taken along the line IV—IV of FIGS. 1 and 2.

As shown in FIG. 2 and FIG. 3 a lever arm 72 extends from the upper knife carrier 8 in a direction generally horizontally away from the knife 10, at each side of the knife carrier 8. A similar lever arm 73 extends from the lower knife carrier 6 at an upwardly inclined angle at each side of the lower knife carrier 6 towards the end of the upper lever arms 72. Both lever arms are mounted on respective pivot pins 74 at each side of the knife carrier. Each pivot pin 74 is surrounded by a bearing sleeve 75 on which the lower lever arm 73 is directly mounted at its side portions 76, whilst the upper lever arm 72 is mounted on the bearing sleeve 75 through a roller bearing 71.

The base members 1 and 2 are joined through struts 77 at both sides of the apparatus.

As shown in FIG. 3 each side support 3 and 4 has a front and rear vertical guide means consisting of a vertical pin 78 mounted on the side support which engages with a bore 79 in the respective base member, the bore 79 being lined with a bearing sleeve 80. This guide means can ensure that the relative displacement of the base members of side support is effected in a true vertical direction.

The lower crankshaft 5 is shown in FIG. 3 and it is on this crankshaft that the lower knife carrier 6 is pivotably mounted. The part of movement knives 10 and 11 is indicated in chain dotted lines, two examples of adjustment being illustrated. When the upper knife 10 follows the circular path of smaller diameter, the lower knife 11 follows a corresponding elliptical path, whilst when the throw of the crank is increased the upper knife follows the circular path of the larger diameter and the lower knife 11 follows the path of the larger elipse.

Figure 4:
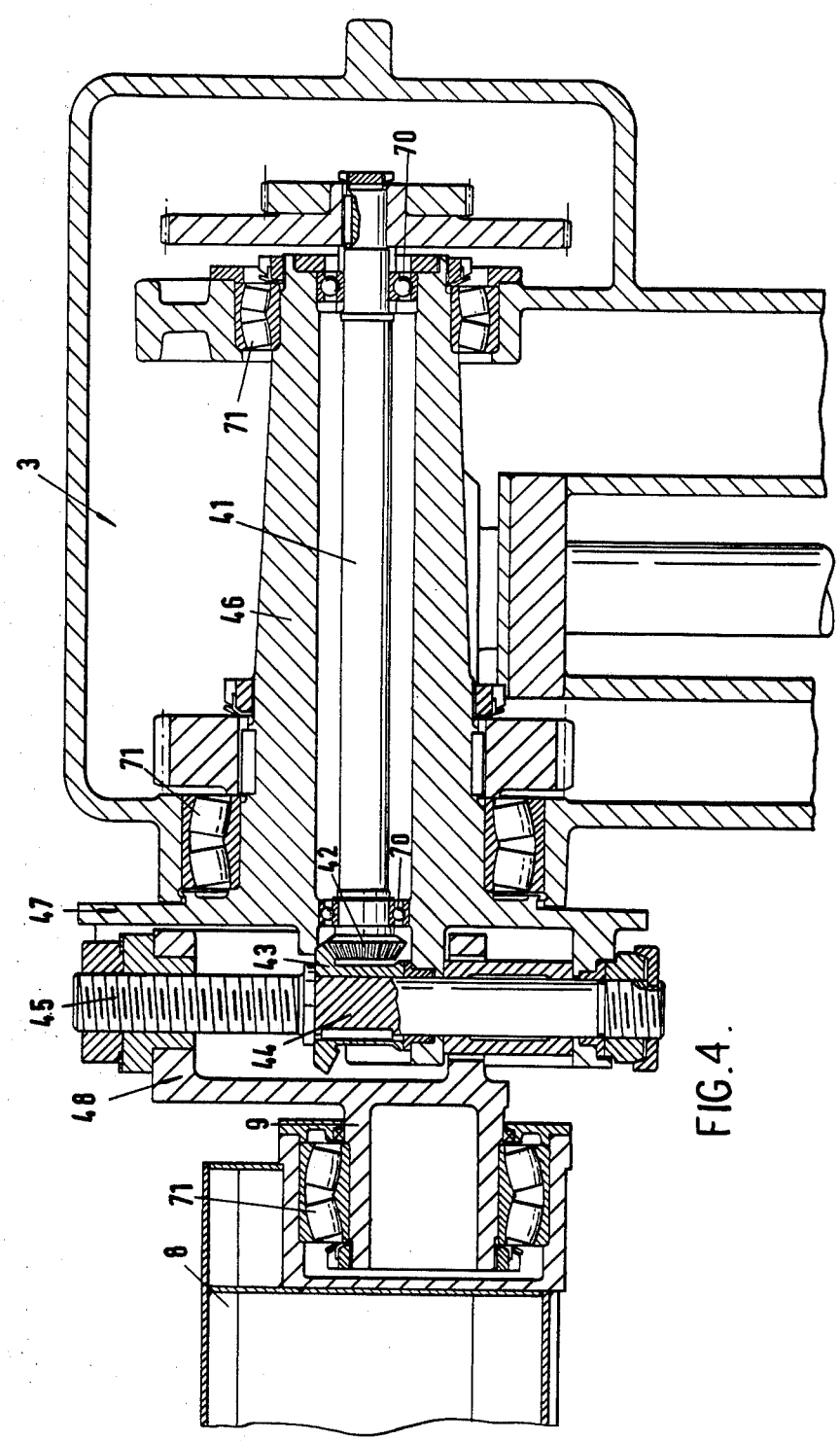
FIG. 4 is a sectional elevation taken along the line IV—IV of FIG. 2.

FIG. 4 shows in further detail the manner in which the upper knife carrier 8 is mounted on the side support 3. The back portion 47 of the crankweb is formed as part of the hollow shaft portion 46 which is pivotably mounted on the roller bearing 71 in side support 3. The second subsidiary shaft 41 is rotatably mounted within the hollow shaft portion 46 through ball bearings 70, the fifth bevelled pinion being mounted on the end of the second subsidiary shaft 41. The sleeve 44 is fixably mounted on the spindle 45 the upper portion 79 of which is threaded. The sleeve 44 provides the bevelled pinion 43 which is in constant mash with the fifth bevelled pinion 42. The spindle 45 is rotatably mounted at its lower end to the back portion 47 but is axially fixed. At its upper end the threaded portion 79 is in engagement with internally threaded boss 80 which is fixed to the displaceable portion 48. A difference in rotation speed between the hollow shaft portion 46 and the second subsidiary shaft 41 causes the spindle 45 to be rotated thereby displacing the displaceable portion in a radial direction to alter the throw of the crank.

Figure 5:
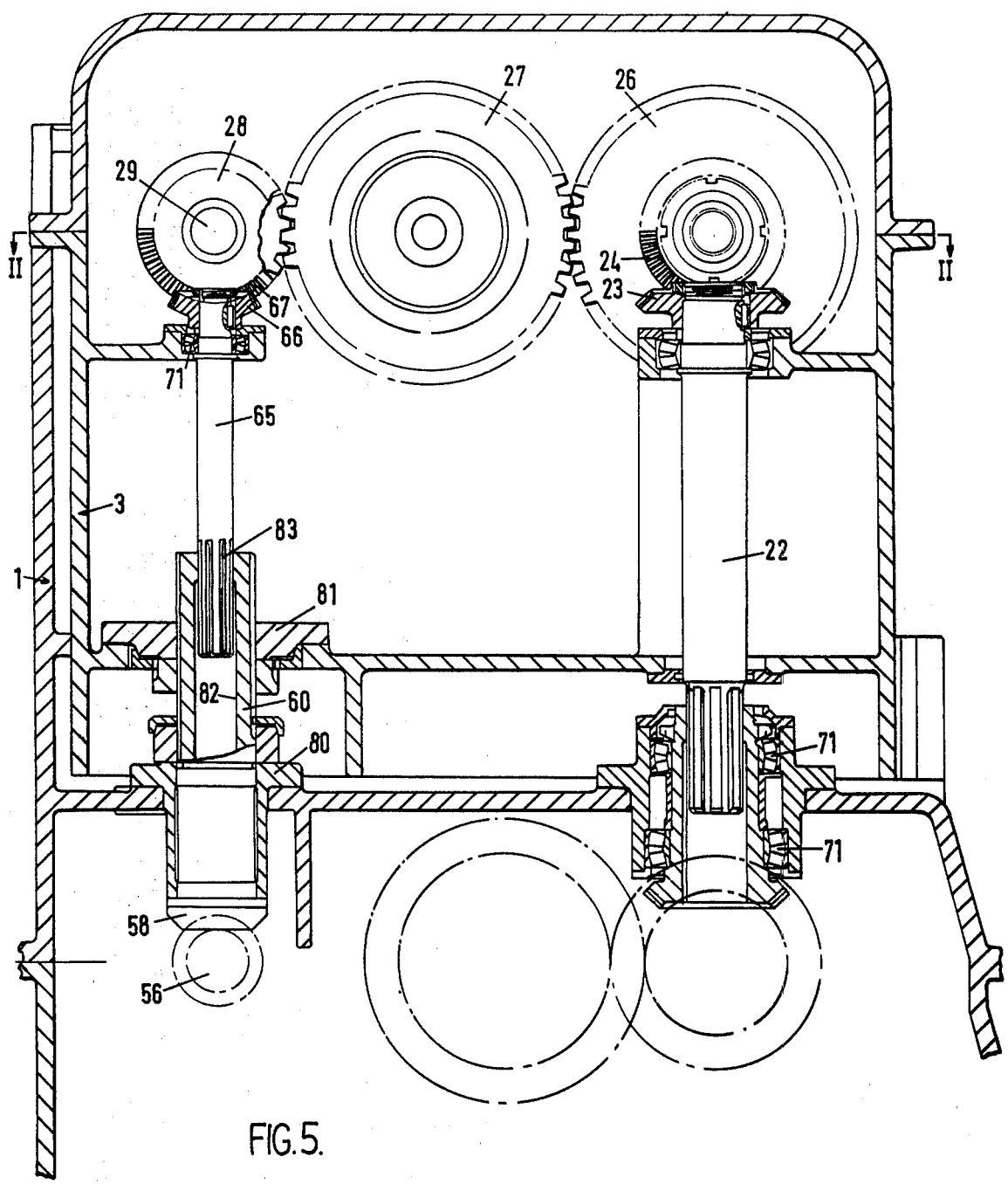
FIG. 5 is a sectional elevation view taken along line V—V of FIG. 2.

FIG. 5 shows a corresponding means for altering the distance between the sight support and its corresponding base member. The threaded spindle 60 is rotatably mounted but axially fixed in a mounting boss 80 of the base member. On the bottom end of the threaded spindle 60 a bevelled pinion 58 is formed, this bevelled pinion 58 being constant mash with a bevelled pinion 51 which is fixably mounted on the adjustment drive shafts 55. In the base of the side supports 3 a corresponding internally threaded boss 81 is mounted in engagement with the threaded spindle 60 so that rotation of the adjustment drive shaft 50 is transmitted into rotation of the threaded spindle 60 so that the side support 3 is raised or lowered. The upper portion of the threaded spindle 60 is provided with an internally splined bore 82 into which the corresponding splined end portion 83 of the shaft 65 is fitted so that any rotation of the threaded spindle 60 is transmitted through the bevelled pinions 66, 67 to the subsidiary shaft 29.

The shaft 22 also has splines at its lower end for engagement with a corresponding shaft which is driven by the main drive shaft 12.

The flying shear shown in the drawing is constructed so that the knives always move in synchronism and follow a path of movement typically indicated by chain dotted lines in FIG. 3, the stock moving in the direction of arrow A shown in FIG. 3.

What I claim is:

1. A flying shear for transversely cutting moving rolled stock, the flying shear comprising a body portion, two knife carriers each adapted to carry a knife, a lever arm extending from each knife carrier, a crank mounted on the body portion and adapted to be driven to rotate about an axis extending substantially perpendicular to the direction in which the stock is arranged to be moved and in a plane substantially parallel to the stock, a first of said knife carriers being rotatably mounted on said crank, the second of said knife carriers being pivotably mounted on said body portion, about an axis extending substantially parallel to said crank axis and said lever arms extending from each knife carrier being pivotably connected about an axis of pivoting extending substantially parallel to said crank axis, first means for adjusting the throw of the crank, and second means for adjusting the distance between the axis of the crank and the axis of pivoting of the crank, whereby: the speed of the crank, the first adjusting means and the second adjusting means are suitably adjusted relative to the rate at which the stock is supplied for cutting to move the knife carriers such that when knives are mounted on the knife carriers the knives are moved to cooperate to cut the stock and the tangential velocity of the knives is substantially the same as the velocity of the stock at the time of cutting.

2. A flying shear as claimed in claim 1, wherein the first adjustment means comprises an adjusting unit for altering the throw of the crank at each end of the first knife carrier and the second adjusting means comprises an adjustment unit at each side of the body portion generally at each end of the second knife carrier.

3. A flying shear as claimed in claim 1, wherein the first adjustment means comprises a first portion associated with the pin of the crank and a second portion associated with the shaft of the crank, one of said portions having a threaded spindle rotately mounted but axially fixed thereon, the axis of the spindle extending in the direction of the arm of the crank and the other said portions having a captive nut mounted thereon and mounted on the threaded spindle and means for rotating either the threaded spindle or the nut whereby the first portion is movable in the direction of the crank on rotation of either the spindle or the nut to adjust the throw of the crank.

4. A flying shear as claimed in claim 1, wherein the second adjustment means comprises a first portion associated with the portion of said body portion in which the crank is mounted, and a second portion associated with the portion of the body portion on which the second knife carriers is pivotably mounted, one of said portions having a threaded spindle rotatably mounted but axially fixed thereon, the axis of the spindle extending in the direction of the arm of the crank and the other of said portions having a captive nut mounted thereon and mounted on the threaded spindle and means for rotating either the threaded spindle or the nut whereby the first portion is movable in the direction between the axis of the crank and the axis of pivoting on rotation of the nut to adjust said distance.

5. A flying shear as claimed in claim 3, wherein the flying shear includes adjustment drive means, and gear means for connecting the adjusting drive means to the respective nuts, whereby the same adjustment is made at each of the adjusting means.

6. A flying shear as claimed in claim 5, wherein the crank has a shaft portion mounted on the body portion, the shaft portion being in the form of a hollow shaft, and the gear means associated with the first adjustment means include a drive shaft mounted within said hollow shaft and connected to gearing so as to be normally rotated with the hollow shaft, the gearing including control gearing arranged to alter the speed of rotation of the drive shaft with respect to the other shaft so as to operate the first adjusting means to alter the length of the throw of the crank, and to replace the drive shaft in its normal position when the desired adjustment has been carried out.

7. A flying shear as claimed in claim 6, wherein the control gearing is provided by planatory gear system comprising the elements of a sun pinion, at least one planatory pinion, and an annulus, a drive from the adjustment drive means being arranged to be applied to a first of said elements, a second of said elements being connected to the hollow shaft and the third of said elements being connected to said drive shaft whereby said first element is normally fixed so that drive is transmitted between the second and third of said elements.

8. A flying shear as claimed in claim 1, when the second knife carrier is pivotably mounted on a mounting crank of the body portion through a mounting crank which is arranged to be driven in synchronism with said crank so that the second knife carrier only passes through its cutting position once for every rotation of the mounting crank.

9. A flying shear as claimed in claim 8, wherein the mounting crank is connected to the variable gear having gear selection means, the variable gear being adapted to be connected to drive motor.

10. A flying shear as claimed in claim 1, wherein the lever arms are pivotably connected by a pin, the pin acting as a crank pin for each lever arm.